(12) United States Patent  
Viswanathan (10) Patent No.: US 8,957,895 B2
(45) Date of Patent: Feb. 17, 2015

(54) SYSTEMS AND METHODS FOR RENDERING 2D GRID DATA (75) Inventor: Venkatraman Viswanathan, Spring, TX (US)

(73) Assignee: Landmark Graphics Corporation, Houston, TX (US)

( * ) Notice: Subject to any disclaimer, the term of this patent is extended or adjusted under 35 U.S.C. 154(b) by 490 days.

(21) Appl. No.: 13/228,081

(22) Filed: Sep. 8, 2011

(65) Prior Publication Data

US 2013/0063461 A1 Mar. 14, 2013

(51) Int. Cl.
*G06T 15/80* (2011.01)
*G06T 15/00* (2011.01)

(52) U.S. Cl.
CPC ............... *G06T 15/005* (2013.01); *G06T 15/80* (2013.01)
USPC ............................. 345/426; 345/419; 345/423

(58) Field of Classification Search
USPC ............ 345/418, 419, 426, 654, 665; 367/72; 702/16
See application file for complete search history.

(56) References Cited

U.S. PATENT DOCUMENTS

| 7,184,041 B2 * | 2/2007 | Heng et al. ..................... 345/424 |
| 2003/0112704 A1 * | 6/2003 | Goff et al. ........................ 367/72 |
| 2006/0089806 A1 * | 4/2006 | Fitzsimmons et al. .......... 702/14 |
| 2008/0144903 A1 * | 6/2008 | Wang et al. ..................... 382/130 |
| 2008/0309676 A1 * | 12/2008 | Nehab et al. ................... 345/582 |
| 2010/0194768 A1 * | 8/2010 | Schrag ........................... 345/584 |

* cited by examiner

*Primary Examiner* — Kimbinh T Nguyen
(74) *Attorney, Agent, or Firm* — Crain, Caton & James; Jennifer Trillsch (57) ABSTRACT Systems and methods for rendering 2D grids using texture mapping and fragment shaders.

18 Claims, 7 Drawing Sheets
(4 of 7 Drawing Sheet(s) Filed in Color)

SYSTEMS AND METHODS FOR RENDERING 2D GRID DATA

CROSS-REFERENCE TO RELATED APPLICATIONS

Not applicable.

STATEMENT REGARDING FEDERALLY SPONSORED RESEARCH

Not applicable.

FIELD OF THE INVENTION

The present invention generally relates to systems and methods for rendering two-dimensional (2D) grid data. More particularly, the present invention relates to rendering 2D grids using texture mapping and fragment shaders.

BACKGROUND OF THE INVENTION

In the field of rendering grid data, 2D grids have traditionally been rendered as lighted surfaces in three-dimensional (3D) views. The same techniques have been used to render 2D grids in 2D views by treating the 2D view as a 3D view with a fixed view point. These conventional techniques impose memory and processing speed requirements that make it difficult, if not impossible, to render and manipulate large grids at interactive speeds as demonstrated below.

The rendering of 2D grids in 3D views is usually done by using an infinite light source to light a mesh of quads with normal vectors specified at the vertices of the quads. The quad meshes and normals are then processed by the fixed function graphics pipeline of the graphics card.

The mesh of quads is built using one of two methods—(a) by building quads whose vertices are at the bin locations of the 2D grid or (b) by subdividing the grid by two in each dimension and extending the grid by half a cell at the boundaries, interpolating the z values at the subdivided locations and then building quads centered at the bin locations of the sub-divided 2D grid.

Both methods result in a surface whose z value at the x,y coordinates of a bin location matches the value of the grid at that bin location.

The first method uses less memory but a major disadvantage is that points in the grid that do not have a sufficient number of neighbors will not get rendered. This is problematic for sparse grids such as horizons of a 3D survey that have been interpreted every other line. As a result, the second method is currently the preferred method.

For a fully populated m×m grid, the first method will result in close to $m^2$ quads whereas the second method results in 4 $m^2$ quads. Assuming that the quad meshes are indexed quad meshes this would result in close to 2 $m^2$ vertices for the first method and 8 $m^2$ quads for the second method. Each vertex requires three 3 floating point values for the corresponding x, y and z coordinates and three 3 floating point values for the three components of the normal at that vertex. Assuming single precision, this results in 24 bytes for each vertex. The first method would therefore, end up requiring 48 $m^2$ bytes and the second method 192 $m^2$ bytes. For a 10000×10000 3D survey, a single horizon would require more than 19 Gigabytes of storage for the second method, which exceeds the capacity available in even the highest end graphics cards available today. Apart from the memory required, the processing time required to build the surface mesh and to calculate normals increases the amount of time before the image is rendered and can be displayed for conventional hill shading.

The geometry of the quad mesh and the normals at the vertices are used to compute the lighted colors at the vertices. The lighted colors are interpolated within the quads. The geometry is also used to perform a hidden surface computation, which is not really a consideration for map views because the 2D grid is viewed in a direction in which the grid is single valued along the z-axis. Nevertheless, the computation of the lighted colors at the vertices is still required and takes up significant memory.

SUMMARY OF THE INVENTION

The present invention therefore, overcomes one or more deficiencies in the prior art by providing systems and methods for rendering 2D grids using texture mapping and fragment shaders.

In one embodiment, the present invention includes a method for rendering 2D grid data, comprising: i) selecting a sub-grid built from a 2D grid, the 2D grid comprising 2D grid data; ii) identifying parameters for a fragment shader; iii) calculating a geometry for the sub-grid using a geometry of the 2D grid; (iv) rendering the geometry for the sub-grid using a computer processor, the geometry including fragments within the geometry; and v) applying the fragment shader for each fragment within the rendered geometry to color or shade each fragment based on the identified parameters.

In another embodiment, the present invention includes a non-transitory program carrier device tangibly carrying computer executable instructions for rendering 2D grid data, the instructions being executable to implement: i) selecting a sub-grid built from a 2D grid, the 2D grid comprising 2D grid data; ii) identifying parameters for a fragment shader; iii) calculating a geometry for the sub-grid using a geometry of the 2D grid; (iv) rendering the geometry for the sub-grid, the geometry including fragments within the geometry; and v) applying the fragment shader for each fragment within the rendered geometry to color or shade each fragment based on the identified parameters.

Additional aspects, advantages and embodiments of the invention will become apparent to those skilled in the art from the following description of the various embodiments and related drawings.

BRIEF DESCRIPTION OF THE DRAWINGS

The patent or application file contains at least one drawing executed in color. Copies of this patent or patent application publication with color drawing(s) will be provided by the United States Patent and Trademark Office upon request and payment of the necessary fee. The present invention will be described with reference to the accompanying drawings, in which like elements are referenced with like reference numerals, and in which.

DETAILED DESCRIPTION OF THE PREFERRED EMBODIMENTS

The subject matter of the present invention is described with specificity, however, the description itself is not intended to limit the scope of the invention. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. While the present invention may be applied in the oil and gas industry, it is not limited thereto and may also be applied in other industries to achieve similar results.

Method Description

Figure 1:
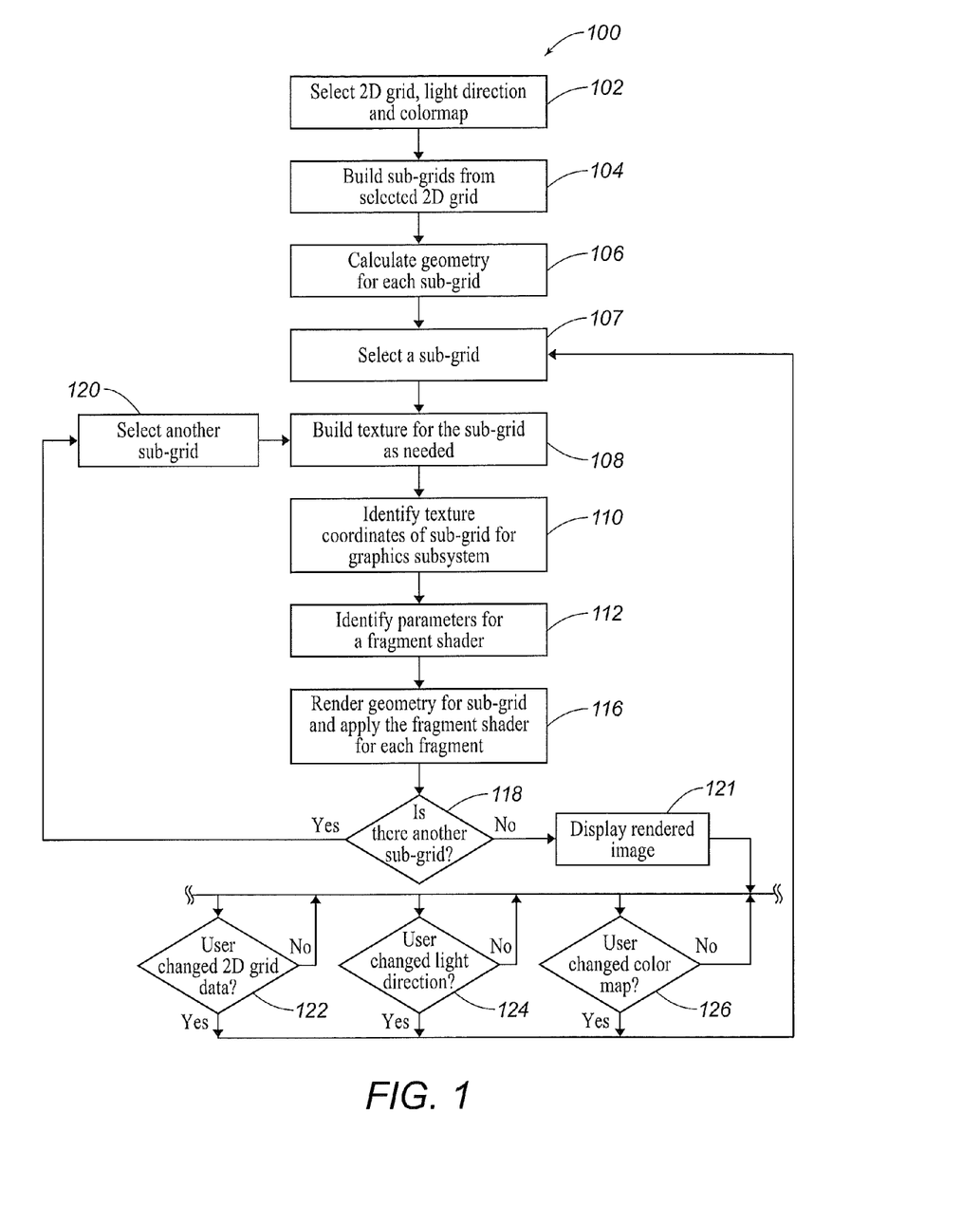
FIG. 1 is a flow diagram illustrating one embodiment of a method for implementing the present invention.

Referring now to FIG. 1, a flow diagram illustrates one embodiment of a method 100 for implementing the present invention.

In step 102, a user may select a 2D grid, a light direction and a color map. The 2D grid includes data that may represent a 3D seismic horizon, a surface grid or a time slice of a 3D seismic volume for a map view display or a vertical seismic section for a section view display.

In step 104, one or more sub-grids grids are built from the 2D grid selected in step 102 using techniques known well in the art such as, for example, subdividing the 2D grid into multiple tiles that represent sub-grids. Each sub-grid should be an appropriate size that can be efficiently processed considering the amount of 2D grid data to be displayed.

In step 106, a geometry is calculated for each sub-grid using the geometry of the 2D grid and techniques well known in the art. Exemplary geometries for a sub-grid may include a simple rotated rectangle or an arbitrary quadrilateral.

In step 107, a sub-grid is selected from the sub-grids built in step 104. The sub-grid may be selected at random or based on other factors such as, for example, simply selecting the very first sub-grid.

In step 108, a texture is built for the sub-grid selected in step 107, as needed, using techniques well known in the art and data from the 2D grid selected in step 102. If, for example, a texture for the sub-grid selected in step 107 has never been built or if data for that sub-grid has changed since the last time a texture was built for that sub-grid, then the texture would have to be built for the sub-grid during this step. The texture may be built, for example, by creating a texture in a graphics subsystem and populating it with the sample values of the sub-grid.

In step 110, the texture coordinates of the sub-grid selected in step 107 are identified for the graphics subsystem using techniques well known in the art.

In step 112, parameters for a fragment shader are identified using techniques well known in the art. The parameters may include, for example, the texture for the sub-grid and how it maps to the geometry calculated for the sub-grid in step 106, the light direction selected in step 102 and the colormap selected in step 102.

In step 116, the geometry from step 106 for the sub-grid is rendered using techniques well known in the art. The geometry, for example, may be rasterized during the rendering process to produce fragments within the geometry. The fragment shader is then applied for each fragment within the rendered geometry.

In step 118, the method 100 checks for additional sub-grids built in step 104 to determine if there is another sub-grid. If there is another sub-grid, then the method 100 proceeds to step 120. If there is not another sub-grid, then the method 100 proceeds to step 121.

In step 120, another sub-grid is selected from the sub-grids built in step 104. Another sub-grid may be selected in the same manner as the sub-grid selected in step 107. After another sub-grid is selected, the method 100 proceeds through steps 108, 110, 112, 116 and 118 until every sub-grid built in step 104 has been selected and processed in the manner thus described.

Figure 3:
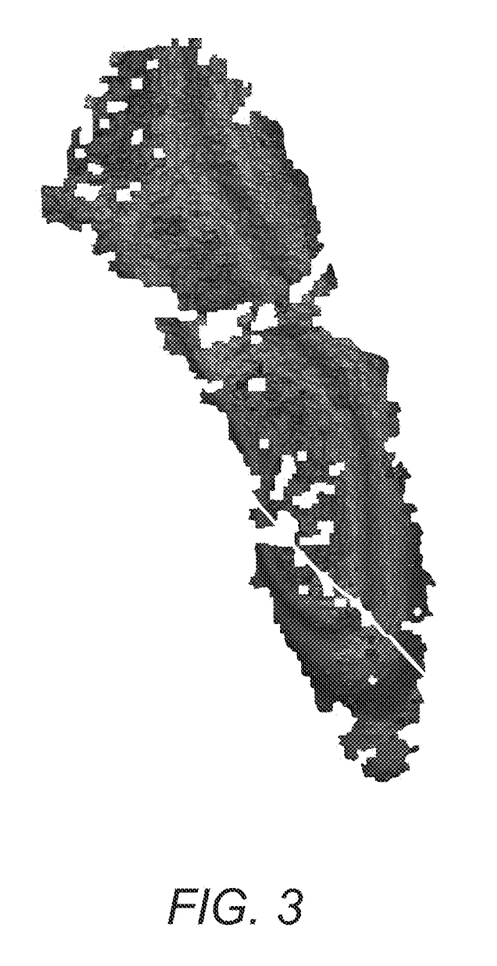
FIG. 3 is a color drawing illustrating one example of the results of step 121 in FIG. 1.

In step 121, the results rendered from the iterative performance of step 116 are displayed as a rendered image of the 2D grid data with shading and/or coloring after all of the sub-grids built in step 104 are selected and processed according to steps 107-118. The color drawing illustrated in FIG. 3 is one example of a rendered image that may be displayed. The rendered image may be displayed in a map view representing a 3D seismic horizon, a surface grid or a time slice of a 3D seismic volume. Alternatively, the rendered image may be displayed in a section view representing a vertical seismic section. In FIG. 3, the rendered image is displayed in a map view and represents a 3D seismic horizon, which is based upon data provided by the RMOTC and the U.S. Department of Energy.

After the rendered image is displayed in step 121, several options described in reference to steps 122, 124 and 126 may be interactively controlled by the user to change the rendered image and compare any differences between the original rendered image and a new rendered image. The user therefore, may proceed to step 122, 124 or 126.

Figure 4:
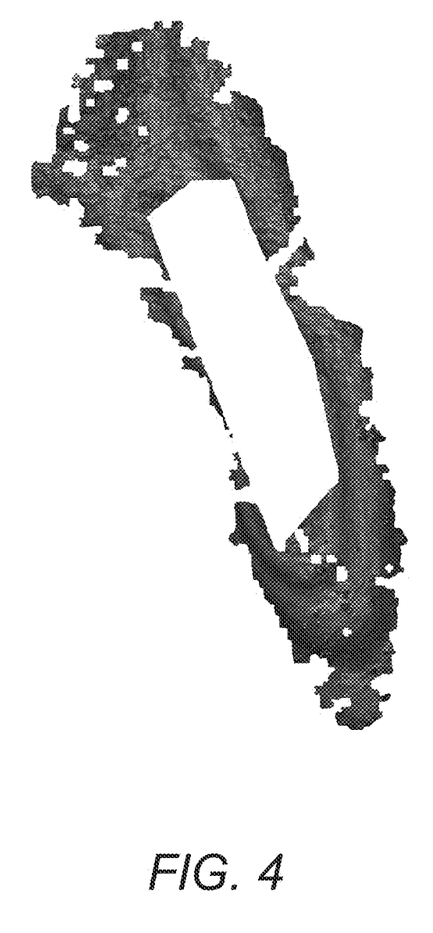
FIG. 4 is a color drawing illustrating another example of the results of step 121 in FIG. 1.

In step 122, the method 100 determines whether the user changed the 2D grid data for the 2D grid selected in step 102 using techniques well known in the art. If the user changed the 2D grid data, then the method 100 proceeds to step 107 to select a sub-grid from the sub-grids built in step 104. The sub-grid is then processed according to steps 108 through 121 using the changed 2D grid data in step 108. If the 2D grid data is not changed by the user, then the method 100 may return to step 124 or 126. The color drawing illustrated in FIG. 4 is another example of a rendered image that may be displayed in step 121 after the user changes the 2D grid-data. In FIG. 4, the rendered image is displayed in a map view and represents a 3D seismic horizon, which is based upon the same data provided by the RMOTC and the U.S. Department of Energy.

Figure 5:
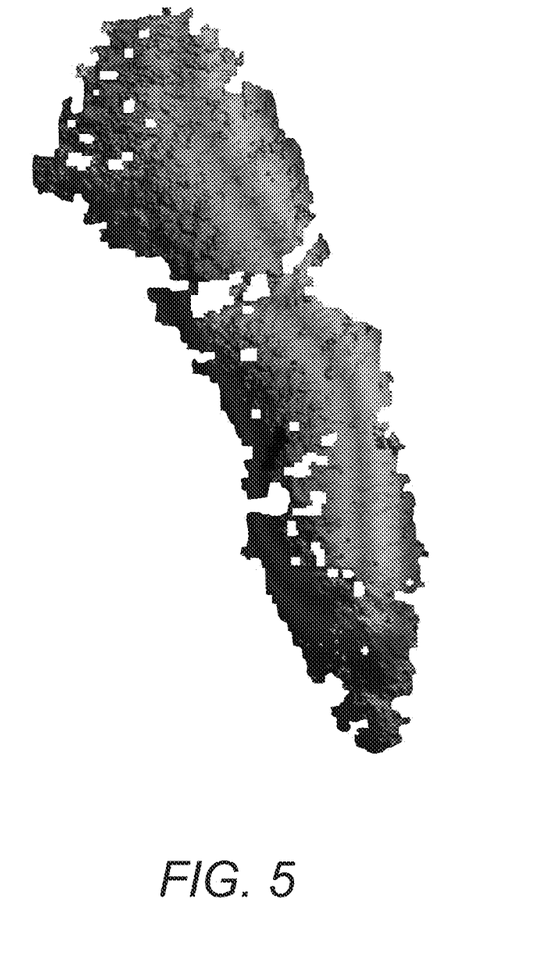
FIG. 5 is a color drawing illustrating another example of the results of step 121 in FIG. 1.

In step 124, the method 100 determines whether the user changed the light direction selected in step 102 using techniques well known in the art. If the user changed the light direction, then the method 100 proceeds to step 107 to select a sub-grid from the sub-grids built in step 104. The sub-grid is then processed according to steps 108 through 121 using the changed light direction in steps 112 and 116. If the light direction is not changed by the user, then the method 100 may return to step 122 or 126. The color drawing illustrated in FIG. 5 is another example of a rendered image that may be displayed in step 121 after the user changes the light direction. In FIG. 5, the rendered image is displayed in a map view and represents a 3D seismic horizon, which is based upon the same data provided by the RMOTC and the U.S. Department of Energy.

Figure 6:
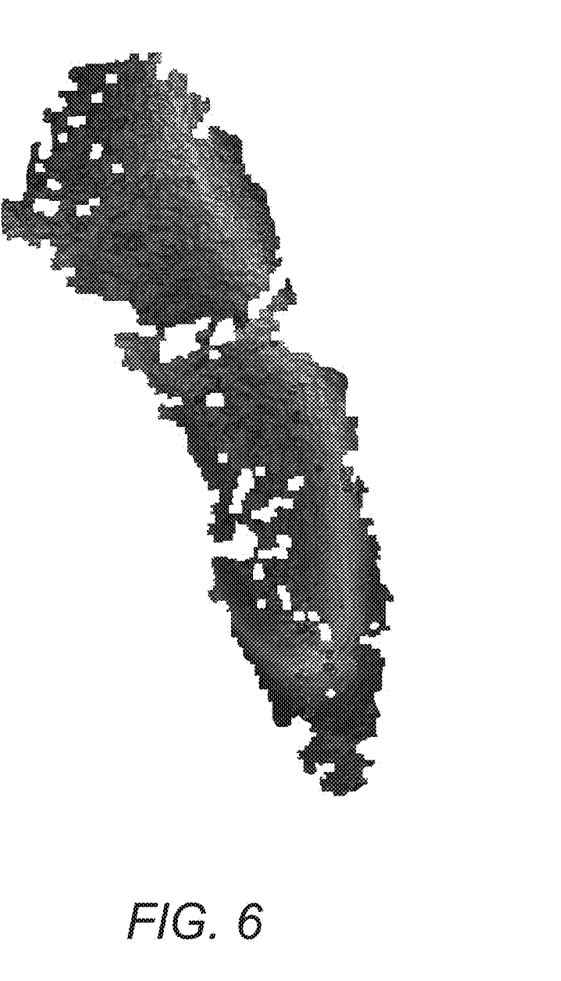
FIG. 6 is a color drawing illustrating another example of the results of step 121 in FIGS. 1.

In step 126, the method 100 determines whether the user changed the color map selected in step 102 using techniques well known in the art. If the user changed the color map, then the method 100 proceeds to step 107 to select a sub-grid from the sub-grids built in step 104. The sub-grid is then processed according to steps 108 through 121 using the changed color map in steps 112 and 116. If the color map is not changed by the user, then the method 100 may return to step 122 or 124. The color drawing illustrated in FIG. 6 is another example of a rendered image that may be displayed in step 121 after the user changes the color map. In FIG. 6, the rendered image is displayed in a map view and represents a 3D seismic horizon, which is based upon the same data provided by the RMOTC and the U.S. Department of Energy.

If the method 100 is used to process a 10,000×10,000 3D survey, then a single horizon would require just 400 Megabytes of storage compared to 19 Gigabytes required for some conventional hillshading methods. Moreover, the method 100 may reduce the processing/rendering time for a single horizon by at least 90% compared to the processing/rendering time required by some conventional hillshading methods.

Figure 2:
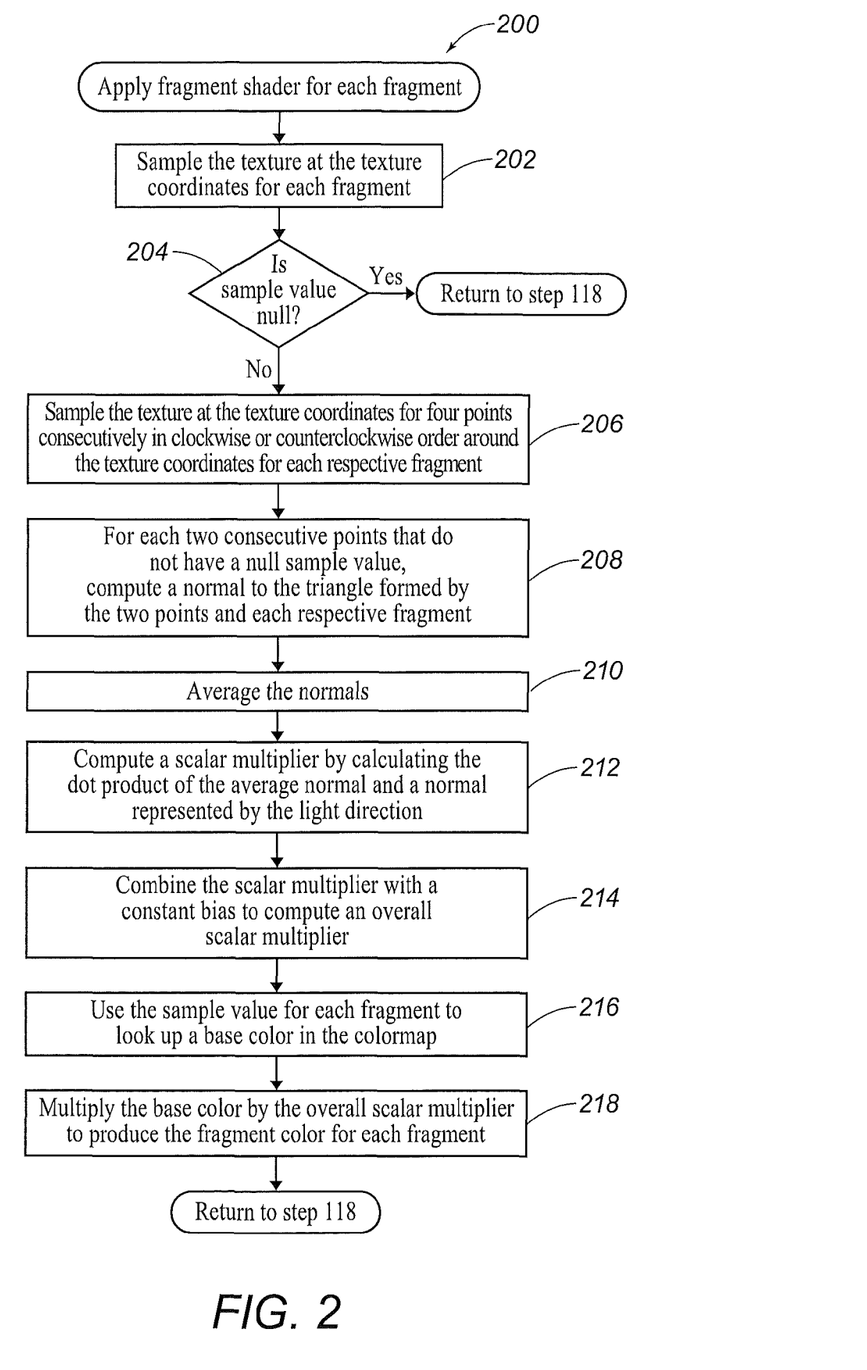
FIG. 2 is a flow diagram illustrating one embodiment of a method for performing step 116 in FIG. 1.

Referring now to FIG. 2, a flow diagram illustrates one embodiment of a method 200 for performing step 116 in FIG. 1. The fragment shader may be applied, in one embodiment, to each fragment within the geometry rendered in step 116 at the same time. Alternatively, the fragment shader may be applied in a sequential manner to each fragment within the geometry rendered in step 116.

In step 202, the texture for the sub-grid is sampled at the texture coordinates for each fragment using techniques well known in the art. The sample value represents the value at the sub-grid location of the fragment.

In step 204, the method 200 determines if the sample value from step 202 is null using techniques well known in the art. If the sample value from step 202 is null, then the method 200 returns to step 118. If, however, the fragment shader is applied in a sequential manner to each fragment, then the method 200 may return to step 202 for the next fragment. If the sample value is not null, then the method 200 proceeds to step 206.

In step 206, the texture for the sub-grid is sampled at the texture coordinates for four points consecutively in clockwise or counterclockwise order around the texture coordinates for each respective fragment using techniques well known in the art. Preferably, the order is clockwise, however, may be counterclockwise depending on the light direction. Each point is preferably a texel distance away from the texture coordinates for each respective fragment and may be selected along the rows/columns of the texture for a rectangular sub-grid or, for a quadrilateral, along directions corresponding to the sides of the quadrilateral. The selection of the four points therefore, depends upon how the texture for each sub-grid maps to the geometry calculated for each sub-grid in step 106, which is a parameter for the fragment shader identified in step 112.

In step 208, a normal is computed using techniques well known in the art. The normal is computed relative to each triangle formed by two consecutive points that do not have a null sample value from step 206 and each respective fragment. The computation considers how the texture for each sub-grid maps to the geometry calculated for each sub-grid in step 106, which is a parameter for the fragment shader identified in step 112.

In step 210, the normals computed in step 208 are averaged.

In step 212, a scalar multiplier is computed by calculating the dot product of the average normal from step 210 and a normal represented by the light direction selected in step 102.

In step 214, an overall scalar multiplier is computed by combining the scalar multiplier computed in step 212 with a constant bias.

In step 216, the sample value in step 202 for each fragment is used to look up a base color in the color map selected in step 102 using techniques well known in the art.

In step 218, the base color from step 216 is multiplied by the overall scaler multiplier computed in step 214 to produce a fragment color for each fragment. Although the color map, base color and fragment color may be represented by multiple colors, they may, optionally, be represented by multiple shades of gray using a gray-scale. The method 200 then returns to step 118.

Various alternative embodiments and options may be practiced without departing from the spirit and scope of the invention described in reference to FIGS. 1-2.

For example, rendered images may be displayed with shading and/or coloring by using one or more attributes and a z-surface. In one embodiment, the fragment shader may be used to look up the base color using one 2D grid and compute the normals using another 2D grid. This is useful in visualizing the structure represented by one 2D grid and another attribute (property) represented by another 2D grid—at the same time. Consequently, the method 100 may be applied in a similar manner after the selection of two 2D grids. In another embodiment, the fragment shader may be used to determine the base color by first computing a value using a combination of multiple attributes. This combination could be any mathematical expression. This value may then be used by the fragment shader to look up the base color in a colormap. Consequently, the method 100 may be applied in a similar manner after the selection of two 2D grids. Each 2D grid therefore, would represent a different attribute.

In another example, rendered images may be displayed with shading and/or coloring by using multiple light sources and/or different types of light sources. In one embodiment, the method 100 may be applied in a similar manner after the selection of multiple light sources, each with a different direction and possibly different colors. The direction of each light source could be independently used to produce a multiplier. The multipliers could then be used to compute a contribution to the final fragment color. If any of the lights had a color other than white, then the contributions could be different for the red, green and blue components of the color. In another embodiment, the method 100 may be applied in a similar manner after the selection of the type of light source(s) and the parameters for each. One type of light source assumes that the light source is an infinite light source—i.e. rays of light all parallel and are of the same intensity from the source at infinity. Another type of light source assumes the light source is located at a specific point in space and the light intensity attenuates with distance from the source.

System Description

The present invention may be implemented through a computer-executable program of instructions, such as program modules, generally referred to as software applications or application programs executed by a computer. The software may include, for example, routines, programs, objects, components, and data structures that perform particular tasks or implement particular abstract data types. The software forms an interface to allow a computer to react according to a source of input.

DecisionSpace™ may be used to implement the present invention. The software may also cooperate with other code segments to initiate a variety of tasks in response to data received in conjunction with the source of the received data. The software may be stored and/or carried on any variety of memory media such as CD-ROM, magnetic disk, bubble memory and semiconductor memory (e.g., various types of RAM or ROM). Furthermore, the software and its results may be transmitted over a variety of carrier media such as optical fiber, metallic wire and/or through any of a variety of networks such as the Internet.

Moreover, those skilled in the art will appreciate that the invention may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The present invention may therefore, be implemented in connection with various hardware, software or a combination thereof, in a computer system or other processing system.

The system includes a computing unit, sometimes referred to as a computing system, which contains memory, application programs, a client interface, a video interface and a processing unit. The computing unit is only one example of a suitable computing environment and is not intended to suggest any limitation as to the scope of use or functionality of the invention.

The memory primarily stores the application programs, which may also be described as program modules containing computer-executable instructions, executed by the computing unit for implementing the present invention described herein and illustrated in FIGS. 1-2.

Although the computing unit has a generalized memory, the computing unit typically includes a variety of computer readable media. By way of example, and not limitation, computer readable media may comprise computer storage media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to and/or presently being operated on by the processing unit. By way of example, and not limitation, the computing unit includes an operating system, application programs, other program modules, and program data.

The components in memory may also be included in other removable/non-removable, volatile/nonvolatile computer storage media or they may be implemented in the computing unit through an application program interface ("API"), which may reside on a separate computing unit connected through a computer system or network. For example only, a hard disk drive may read from or write to non-removable, nonvolatile magnetic media, a magnetic disk drive may read from or write to a removable, non-volatile magnetic disk, and an optical disk drive may read from or write to a removable, nonvolatile optical disk such as a CD ROM or other optical media. Other removable/non-removable, volatile/non-volatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of a computing unit may be used, those of ordinary skill in the art will appreciate that such components and their interconnection are well known.

Figure 7:
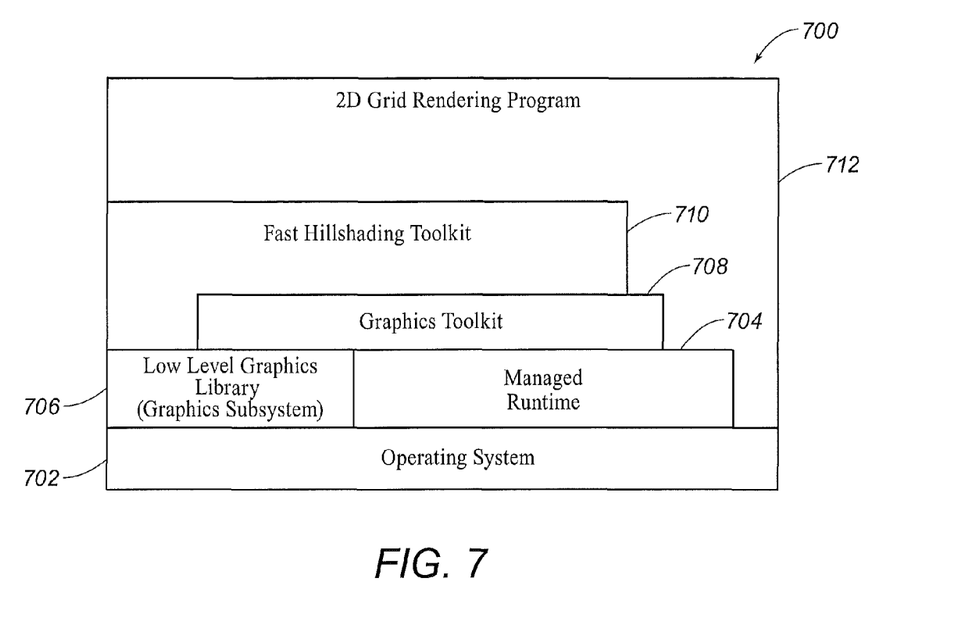
FIG. 7 is a block diagram illustrating one embodiment of a system for implementing the present invention.

One embodiment of a software or program structure for implementing the present invention is illustrated in FIG. 7. At the base of program structure 700 is an operating system 702. Suitable operating systems may include, for example, UNIX® or Linux® operating systems, Windows 7®, and other operating systems generally known in the art.

A managed runtime (e.g. Java virtual machine) 704 overlays the operating system. Examples of the services that the managed runtime 704 provides include object lifecycle management, user interface components, database connectivity and network communication.

A low level graphics library 706 represents the graphics subsystem and interfaces with the operating system 702 and graphics hardware to provide 2D and 3D graphics capabilities. The functions performed by the graphics library 706 include, for example, geometric and raster primitives, RGBA or color index mode, display list or immediate mode, viewing and modeling transformations, lighting and shading, hidden surface removal, alpha blending (translucency), anti-aliasing, texture mapping, atmospheric effects (fog, smoke, haze), feedback and selection, stencil planes, and accumulation buffer, programmable vertex, fragment, geometry shaders and tessellation.

A particularly useful graphics library is OpenGL®. The OpenGL® API is a multi-platform industry standard that is hardware, window, and operating system independent. OpenGL® is designed to be callable from C, C++, FORTRAN, Ada and Java programming languages. OpenGL® performs each of the functions listed above for the graphics library 706. Some commands in OpenGL® specify geometric objects to be drawn, and others control how the objects are handled. All elements of the OpenGL® state, even the contents of the texture memory and the frame buffer, can be obtained by a client application using OpenGL®. OpenGL® and the client application may operate on the same or different machines because OpenGL® is network transparent. OpenGL® is described in more detail in the OpenGL® Programming Guide (ISBN: 0-201-63274-8) and the OpenGL® Reference Manual (ISBN: 0-201-63276-4), both of which are incorporated herein by reference.

A graphics toolkit 708 overlays the graphics library 706, the managed runtime 704 and the operating system 702. The graphics toolkit 708 is a higher level API and library for creating interactive graphics applications. The graphics toolkit 708 provides functions that bundle together graphics library state control functions such as lighting, materials, texture, and transparency. These functions track state and the creation of graphics objects that can be rendered later. The toolkit also provides a scene graph that can be used to construct a network of graphics nodes that can be rendered and interacted with. Nodes within the scene graph handle generic data types such as different types of geometry (e.g., triangles or quads) as well as higher level data types such as grids, volumes and logs.

A fast hillshading toolkit 710 is built on top of the graphics toolkit 708 to provide hill shading capabilities for 2D grids in 2D views such as a map view or a section view. A hill shaded display simulates the effect of shining light on a surface built with the samples of the 2D grid. The fast hillshading toolkit 710 may be used to implement steps 104-121 in FIG. 1 and steps 202-218 in FIG. 2.

A 2D grid rendering program 712 contains graphical views including a map view and/or a section view, menus and other user interface elements. These allow an end user to read grids and other data types stored in different databases. These data types are then rendered using different parameters and algorithms. Specifically, for rendering 2D grids as hill-shaded displays in a map view or a section view, the 2D rendering program 712 uses the fast hillshading toolkit 710. The 2D grid rendering program 712 interfaces with a client interface and/or video interface to implement steps 102, 122, 124 and 126 in FIG. 1.

While the present invention has been described in connection with presently preferred embodiments, it will be understood by those skilled in the art that it is not intended to limit the invention to those embodiments. It is therefore, contemplated that various alternative embodiments and modifications may be made to the disclosed embodiments without departing from the spirit and scope of the invention defined by the appended claims and equivalents thereof.

The invention claimed is:

1. A method for rendering 2D grid data, comprising:
   selecting a sub-grid built from a 2D grid, the 2D grid comprising 2D grid data;
   identifying parameters for a fragment shader;
   calculating a geometry for the sub-grid using a geometry of the 2D grid;
   rendering the geometry for the sub-grid using a computer processor, the geometry including fragments within the geometry; and
   applying the fragment shader for each fragment within the rendered geometry to color or shade each fragment based on the identified parameters.

2. The method of claim 1, wherein the sub-grid is selected form one or more sub-grids built from the 2D grid.

3. The method of claim 2, further comprising repeating each step in claim 1 for each sub-grid.

4. The method of claim 3, further comprising displaying a rendered image of the 2D grid data with shading or coloring.

5. The method of claim 1, further comprising building a texture for the sub-grid using the 2D grid data.

6. The method of claim 5, further comprising identifying texture coordinates of the sub-grid.

7. The method of claim 1, wherein the parameters for the fragment shader include a texture for the sub-grid and how it maps to the geometry for the sub-grid, a light direction and a colormap.

8. The method of claim 4, wherein the rendered image is displayed in a map view representing a 3D seismic horizon, a surface grid or a time slice of a 3D seismic volume.

9. The method of claim 4, wherein the rendered image is displayed in a section view representing a vertical seismic section.

10. A non-transitory program carrier device tangibly carrying computer executable instructions for rendering 2D grid data, the instructions being executable to implement:
    selecting a sub-grid built from a 2D grid, the 2D grid comprising 2D grid data;
    identifying parameters for a fragment shader;
    calculating a geometry for the sub-grid using a geometry of the 2D grid:
    rendering the geometry for the sub-grid, the geometry including fragments within the geometry; and
    applying the fragment shader for each fragment within the rendered geometry to color or shade each fragment based on the identified parameters.

11. The program carrier device of claim 10, wherein the sub-grid is selected form one or more sub-grids built from the 2D grid.

12. The program carrier device of claim 11, further comprising repeating each step in claim 1 for each sub-grid.

13. The program carrier device of claim 12, further comprising displaying a rendered image of the 2D grid data with shading or coloring.

14. The program carrier device of claim 10, further comprising building a texture for the sub-grid using the 2D grid data.

15. The program carrier device of claim 14, further comprising identifying texture coordinates of the sub-grid.

16. The program carrier device of claim 10, wherein the parameters for the fragment shader include a texture for the sub-grid and how it maps to the geometry for the sub-grid, a light direction and a colormap.

17. The program carrier device of claim 13, wherein the rendered image is displayed in a map view representing a 3D seismic horizon, a surface grid or a time slice of a 3D seismic volume.

18. The program carrier device of claim 13, wherein the rendered image is displayed in a section view representing a vertical seismic section.

* * * * *